(12) United States Patent
Cummins

(10) Patent No.: US 6,292,910 B1
(45) Date of Patent: Sep. 18, 2001

(54) METHOD AND APPARATUS FOR DETECTING A BUS DEADLOCK IN AN ELECTRONIC SYSTEM

(75) Inventor: T. Scott Cummins, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/153,095

(22) Filed: Sep. 14, 1998

(51) Int. Cl.$^7$ .............................. G06F 9/46; G06F 13/00
(52) U.S. Cl. .............................. 714/43; 709/107
(58) Field of Search ................ 714/43, 48; 710/100, 710/108, 200; 709/100, 235, 107; 700/14; 711/100

(56) References Cited

U.S. PATENT DOCUMENTS 5,067,071 * 11/1991 Schanin et al. .
5,682,551 * 10/1997 Pawlowski et al. .
5,889,972 * 3/1999 Allingham .

* cited by examiner

Primary Examiner—Gopal C. Ray
(74) Attorney, Agent, or Firm—Blakely, Sokoloff, Taylor & Zafman LLP

(57) ABSTRACT

One embodiment of the present invention is an apparatus for detecting a bus deadlock in an electronic system. The apparatus includes a bus tracker circuit to monitor bus transactions to detect a condition that indicates the occurrence of a wait cycle or a retry cycle. The apparatus also includes a counter circuit to indicate that the bus tracker circuit has detected the condition a predetermined number of times.

22 Claims, 4 Drawing Sheets

METHOD AND APPARATUS FOR DETECTING A BUS DEADLOCK IN AN ELECTRONIC SYSTEM

FIELD OF THE INVENTION

The invention relates to the field of validating the functionality of electronic systems, and more particularly to the field of validating the functionality of electronic systems by monitoring bus activity.

BACKGROUND OF THE INVENTION

In electronic systems that include busses for devices to communicate with each other, the occurrence of bus deadlocks decreases the robustness of the system. Therefore, an important part of validating the functionality of these systems is the detection of bus deadlocks or conditions that could lead to bus deadlocks.

A prior approach to detecting bus deadlocks is to set a timer to expire some time after a bus transaction is expected to be completed, then using the expiration of the timer as an indication that a deadlock has occurred. So as to prevent the timer from expiring when there is not a deadlock, the timer is set to accommodate any possible bus transaction, including those that have a duration much longer than that of a typical bus transaction. Then, however, when a deadlock occurs during a typical bus transaction, there can be a delay of many clock cycles before the timer expires. Sometimes, the number of clock cycles of delay can exceed the number of clock cycles for which the validation environment is able to store bus information for debug purposes, so the bus information related to the cause of the deadlock condition is purged by the time the timer expires. This situation can frustrate the validation and debug effort.

Therefore, a novel approach to detecting a bus deadlock in an electronic system has been developed.

SUMMARY OF THE INVENTION

An apparatus for detecting a bus deadlock is disclosed. The apparatus includes a bus tracker circuit to monitor bus transactions to detect a condition that indicates the occurrence of a wait cycle or a retry cycle. The apparatus also includes a counter circuit to indicate that the bus tracker circuit has detected the condition a predetermined number of times.

DETAILED DESCRIPTION OF A PREFERRED EMBODIMENT

A novel approach to detecting a bus deadlock in an electronic system is described. In the following description, specific details are set forth in order to provide a thorough understanding of the present invention. It will be apparent, however, to one skilled in the art that the invention can be practiced without regard to these specific details. In other instances, well known concepts have not been described in particular detail in order to avoid obscuring the present invention.

One embodiment of the present invention is an apparatus for detecting a bus deadlock in an electronic system. The apparatus includes a bus tracker circuit to monitor bus transactions to detect a condition that indicates that a wait cycle or a retry cycle has occurred. The apparatus also includes a counter circuit to indicate that the bus tracker circuit has detected the condition a predetermined number of times.

Unlike the prior approach, the apparatus of the present invention does not use the expiration of a timer to indicate that a bus deadlock has occurred. Instead, the counter circuit indicates that the bus tracker circuit has detected a certain condition a predetermined number of times, and this indication is used as an indication that a bus deadlock has occurred. Therefore, the occurrence of a bus deadlock can be identified within a few clock cycles of the time that the condition is detected, reducing the probability that bus information related to the cause of the deadlock is lost before the deadlock is recognized. Thus, the prospects for debugging the deadlock condition and/or recovering from the deadlock condition are improved.

In one embodiment, the apparatus of the present invention includes a way to store an address of a bus agent involved in the transaction during which the condition was detected. This stored address is therefore available for use during debug.

In another embodiment of the apparatus of the present invention, the number of times that the condition is detected before a deadlock is indicated is programmable. Therefore, a common embodiment of the apparatus of the present invention can be used in multiple systems using a common bus protocol but supporting vastly different transaction types. Also, in validating the functionality of a single system, apparatus of the present invention can be programmed according to the type of transaction being validated in order to increase the efficiency of the validation effort.

Figure 1:
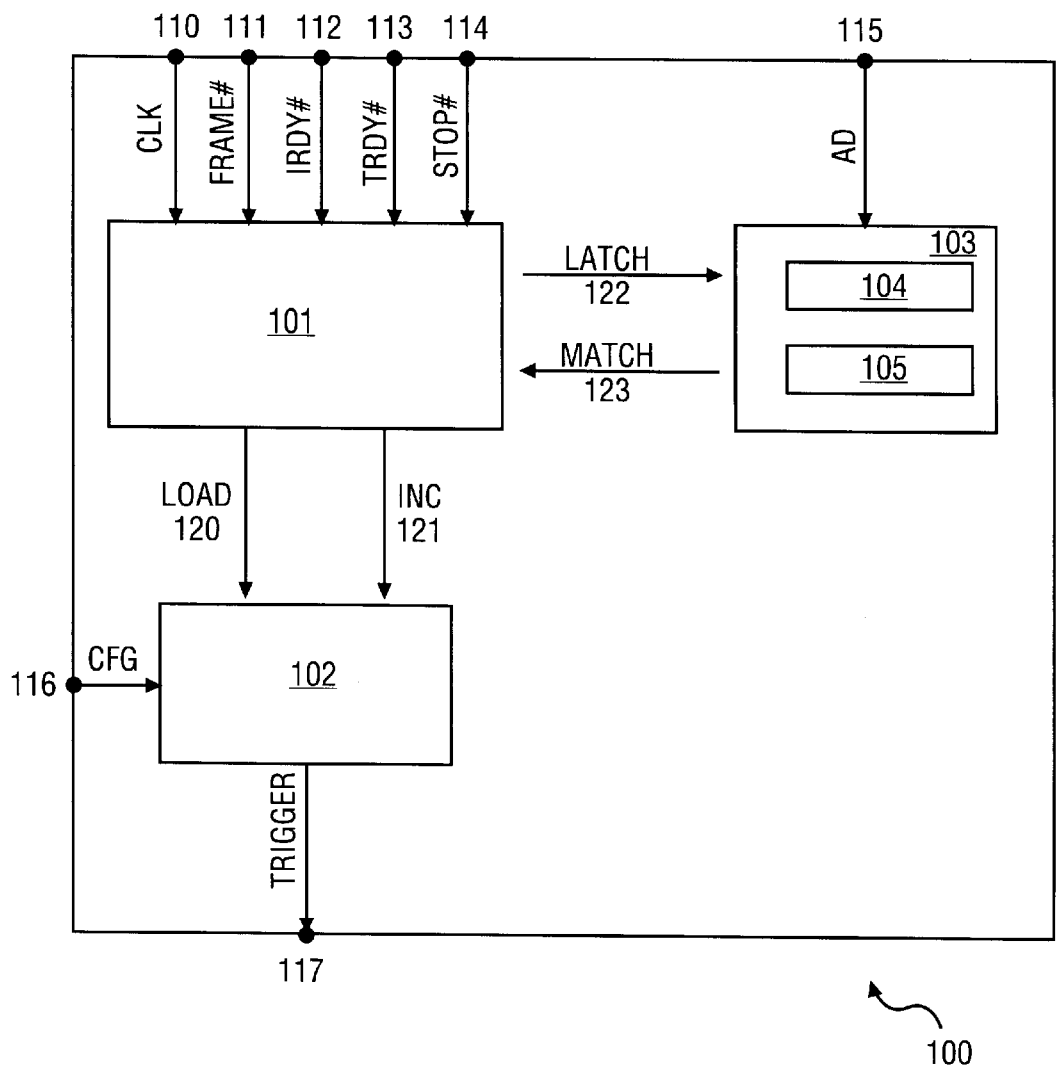
FIG. 1 is a block diagram illustrating one embodiment of the apparatus of the present invention.

FIG. 1 illustrates one embodiment of the present invention in an apparatus for detecting a deadlock on a bus that follows the protocol of the Peripheral Component Interconnect (PCI) bus, as defined by the PCI Local Bus Specification, Revision 2.1, published July 1995. However, the scope of the present invention is not limited to detecting deadlocks on a PCI bus; the present invention can be embodied in an apparatus for detecting a deadlock on any of a variety of types of busses.

FIG. 1 is a block diagram of Event Deadlock Detector (EDD) 100. EDD 100 includes input terminal 110 to receive PCI clock signal CLK, input terminal 111 to receive PCI control signal FRAME#, input terminal 112 to receive PCI control signal IRDY#, input terminal 113 to receive PCI control signal TRDY#, input terminal 114 to receive PCI control signal STOP#, input port 115 to receive PCI address bus AD or any subset of PCI address bus AD, configuration input port 116 to receive sideband signal CFG, and trigger output terminal 117 to provide sideband signal TRIGGER. As used in this specification, the term "terminal" can mean any of a variety of types of electrical connectors, including, but not limited to, portions of conductive lines or wires, pads, pins, and solder bumps. The term "port" can mean any group of one or more terminals. Also, the term "sideband signal" can mean any signal that is not defined by the PCI bus protocol. Other embodiments of the present invention can include any combination of these terminals and any other terminals, including a combination of terminals that includes none of those illustrated in FIG. 1. Any of these terminals, including any of the terminals illustrated in FIG. 1, can be input/output terminals within the scope of the present invention.

EDD 100 also includes bus tracker circuit 101 to monitor bus transactions. In this embodiment, monitoring bus transactions can include, but is not limited to, detecting conditions that indicate the beginning of a transaction, the occurrence of a wait or retry cycle, and the successful completion of a portion of a transaction. According to the PCI bus protocol, a condition that indicates the beginning of a transaction is the assertion of FRAME#. A condition that indicates the occurrence of an initiator wait cycle is that IRDY# is in a deasserted state when sampled during a data phase of a transaction. A condition that indicates the occurrence of a target wait cycle is that TRDY# is in a deasserted state when sampled during a data phase of a transaction A condition that indicates the occurrence of a retry cycle is that TRDY# is in a deasserted state and STOP# is in an asserted state when sampled during the first data phase of a transaction. A condition that indicates the successful completion of a portion of a transaction, in this case the data phase portion of a transaction, is that IRDY# and TRDY# are both in an asserted state when sampled during the same clock cycle of a data phase of a transaction. Thus, in the present embodiment, bus tracker circuit 101 receives one, some, or all of the PCI clock and control signals shown in FIG. 1, and includes logic for detecting one, some, or all of the conditions described above. Any implementation of this logic can be used, including any well known implementation such as a PCI bus tracker state machine.

EDD 100 also includes counter circuit 102 to indicate that bus tracker circuit 101 has detected a specific condition a predetermined number of times. Counter circuit 102 includes logic to implement a counting function on a count value and to indicate when the count value corresponds to a predetermined number Counter circuit 102 can be implemented using a variety of well known techniques In the embodiment illustrated in FIG. 1, counter circuit 102 is programmable to receive the predetermined number. The predetermined number is programmed into counter circuit 102 by loading the count value COUNT with the value of CFG from configuration input port 116 when counter load signal LOAD on signal line 120 is asserted. The counting function is an increment by negative one (i.e. decrement) function, so that COUNT is decremented each time counter increment signal INC on signal line 121 is asserted. The correspondence of COUNT to the predetermined number is indicated by asserting counter output signal TRIGGER on trigger output terminal 117 when COUNT equals zero. In other embodiments, the predetermined number can be fixed in hardware or predetermined in other ways, the counting function can be an increment by positive one function or any other counting function, and the correspondence relationship can be an equivalence of the count value to the predetermined number or any other logical relationship.

EDD 100 also includes address circuit 103, which includes memory circuit 104 to store an address of a bus agent involved in a transaction. Memory circuit 104 can include storage for any number of bits of the bus agent address within the scope of the present invention. In one embodiment, memory circuit 104 includes storage for all 32 bits of a 32 bit address. In this embodiment, memory circuit 104 is loaded with the value of AD from port 115 when address latch signal LATCH on signal line 122 is asserted. Memory circuit 104 can be implemented using a variety of well known techniques.

Address circuit 103 also includes comparator circuit 105 to compare an address of a bus agent involved in a transaction with an address stored in memory circuit 104. Comparator circuit 105 compares any number of bits within the scope of the present invention. In this embodiment, comparator circuit 105 compares the 32 bit value of AD from port 115, representing an address of a bus agent, with a 32 bit address value stored in memory circuit 104, and asserts address match signal MATCH on signal line 123 when these two values match each other. Comparator circuit 105 can be implemented using a variety of well known techniques.

Returning to bus tracker circuit 101 in EDD 100, bus tracker circuit 101 also includes logic to generate counter load signal LOAD on signal line 120, counter increment signal INC on signal line 121, and address latch signal LATCH on signal line 122. Bus tracker circuit 101 also receives address match signal MATCH on signal line 123, along with additional logic to use MATCH as will be described below. If desired, any or all of this logic can be combined with the previously described logic included in bus tracker circuit 101. For example, LOAD, INC, and LATCH can be output signals from a bus tracker state machine, and MATCH can be an input signal to the bus tracker state machine.

The logic of bus tracker circuit 101 and the rest of EDD 100 can be implemented using a variety of well known techniques, so as to operate in accordance with any embodiment of the present invention. For example, in one embodiment of the present invention, illustrated in the flow chart of FIG. 2, EDD 100 is used to detect bus deadlocks resulting from excessive initiator wait cycles.

Figure 2:
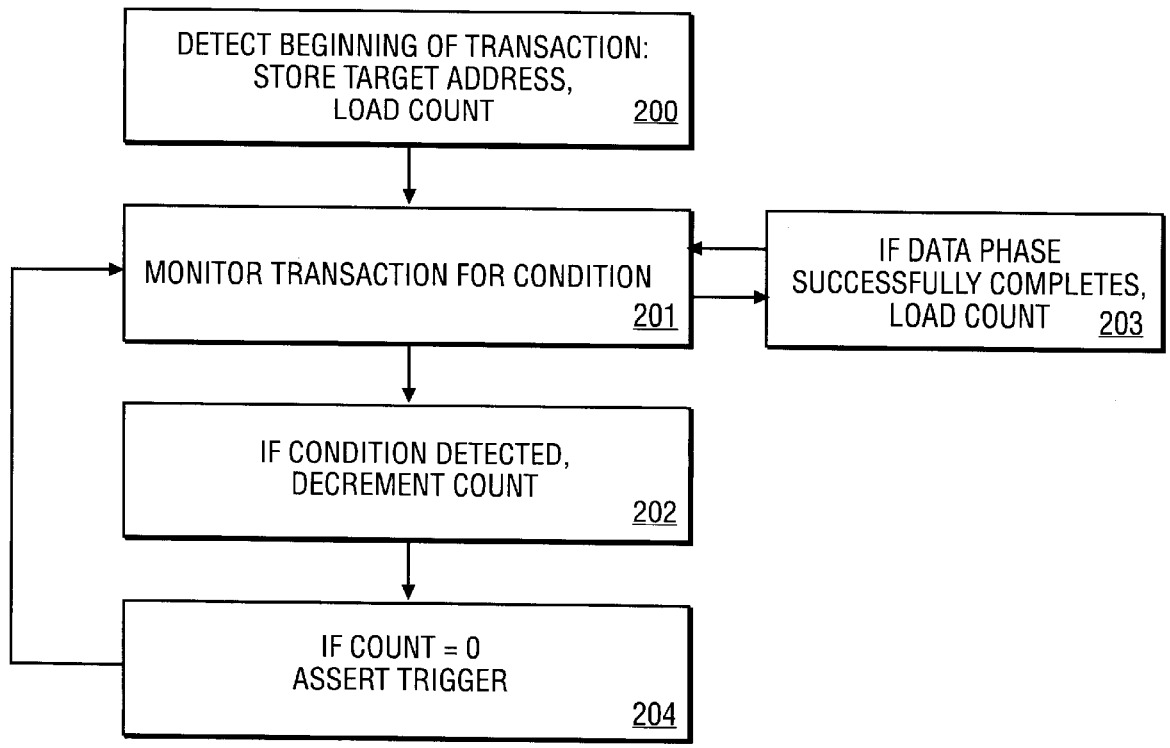
FIG. 2 is a flow chart illustrating an embodiment of the method of the present invention to detect excessive wait cycles.

In step 200 of FIG. 2, based on the assertion of FRAME#, bus tracker circuit 101 detects the beginning of a bus transaction. At this time the address of the target of the transaction is presented on the PCI AD bus, so bus tracker circuit 101 asserts LATCH, causing the target address to be stored in memory circuit 104. Also, bus tracker circuit 101 asserts LOAD, causing COUNT to be loaded with CFG.

Then, in step 201, bus tracker circuit 101 monitors the bus transaction. If bus tracker circuit 101 detects a specific condition, in this case a condition indicating the occurrence of an initiator wait cycle, bus tracker circuit 101 asserts INC, causing COUNT to be decremented, as shown in step 202. If, instead, bus tracker circuit 101 detects that a data phase of the transaction has successfully completed, bus tracker circuit 101 asserts LOAD, causing COUNT to be loaded with CFG, as shown in step 203. Therefore, the number of initiator wait cycles is counted starting from the beginning of every data phase. If the execution of step 202 results in COUNT equaling zero, then TRIGGER is asserted, as shown in step 204, to indicate that a bus deadlock has occurred.

In another embodiment of the present invention, also illustrated in the flow chart of FIG. 2, EDD 100 is used to detect bus deadlocks resulting from excessive target wait cycles. In step 200 of FIG. 2, based on the assertion of FRAME#, bus tracker circuit 101 detects the beginning of a bus transaction. At this time the address of the target of the transaction is presented on the PCI AD bus, so bus tracker circuit 101 asserts LATCH, causing the target address to be stored in memory circuit 104. Also, bus tracker circuit 101 asserts LOAD, causing COUNT to be loaded with CFG.

Then, in step 201, bus tracker circuit 101 monitors the bus transaction. If bus tracker circuit 101 detects a specific condition, in this case a condition indicating the occurrence of a target wait cycle, bus tracker circuit 101 asserts INC, causing COUNT to be decremented, as shown in step 202. If, instead, bus tracker circuit 101 detects that a data phase of the transaction has successfully completed, bus tracker circuit 101 asserts LOAD, causing COUNT to be loaded with CFG, as shown in step 203. Therefore, the number of target wait cycles is counted starting from the beginning of every data phase. If the execution of step 202 results in COUNT equaling zero, then TRIGGER is asserted, as shown in step 204, to indicate that a bus deadlock has occurred.

Figure 3:
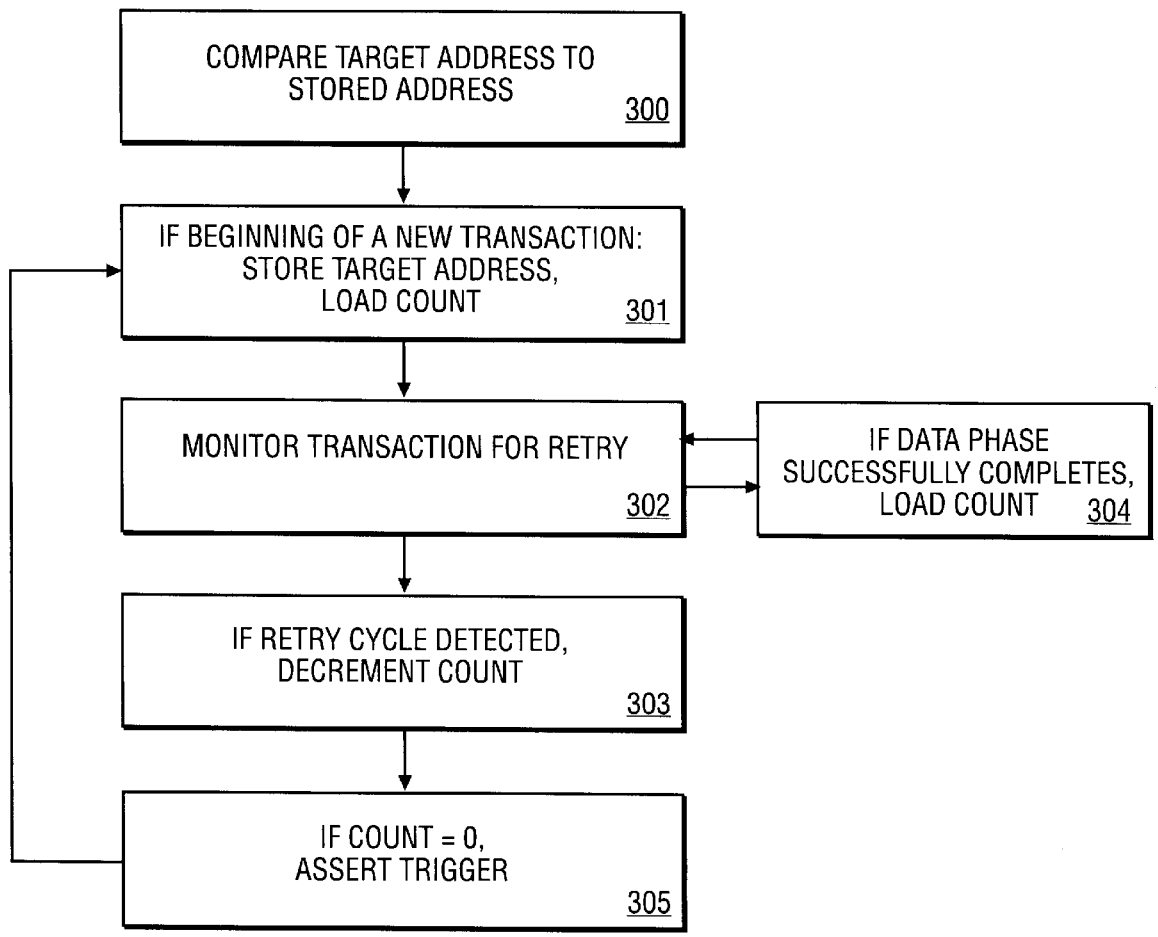
FIG. 3 is a flow chart illustrating an embodiment of the method of the present invention to detect excessive retry cycles.

In another embodiment of the present invention, illustrated in the flow chart of FIG. 3, EDD 100 is used to detect bus deadlocks resulting from excessive retry cycles. In step 300 of FIG. 3, comparator circuit 105 compares a target address presented on the AD bus to an address stored in memory circuit 104. The address stored in memory circuit 104 is the address of a transaction that previously failed to complete successfully because it was terminated based on a retry cycle. If the addresses match, then MATCH is asserted to indicate that the transaction is not a new transaction (i.e. it is a transaction that previously failed to complete successfully because it was terminated based on a retry cycle). If a transaction is beginning that is a new transaction, then bus tracker circuit 101 asserts LATCH, causing the target address to be stored in memory circuit 104, and LOAD, causing COUNT to be loaded with CFG, as shown in step 301. MATCH can be used by bus tracker circuit 101 to prevent the assertion of LATCH and LOAD.

Then, in step 302, bus tracker circuit 101 monitors the bus transaction. If bus tracker circuit 101 detects a retry cycle, bus tracker circuit 101 asserts INC, causing COUNT to be decremented, as shown in step 303. If, instead, bus tracker circuit 101 detects that a data phase of the transaction has successfully completed, bus tracker circuit 101 asserts LOAD, causing COUNT to be loaded with CFG, as shown in step 304. If the execution of step 303 results in COUNT equaling zero, then TRIGGER is asserted, as shown in step 305, to indicate that a bus deadlock has occurred.

Many other embodiments of the present invention are possible. For example, EDD 100 can be used to detect conditions that indicate the occurrence of a wait or a retry cycle according to any bus protocol. A wait cycle can be any period in which a bus transaction is delayed. For example, an initiator wait cycle can be any period in which a bus transaction is delayed because the bus master or the agent that initiated the transaction is not ready for the transaction to continue. A target wait cycle can be any period in which a bus transaction is delayed because the target is not ready for the transaction to continue. A retry cycle can be any period in which there is an indication that a transaction will not be successfully completed.

Figure 4:
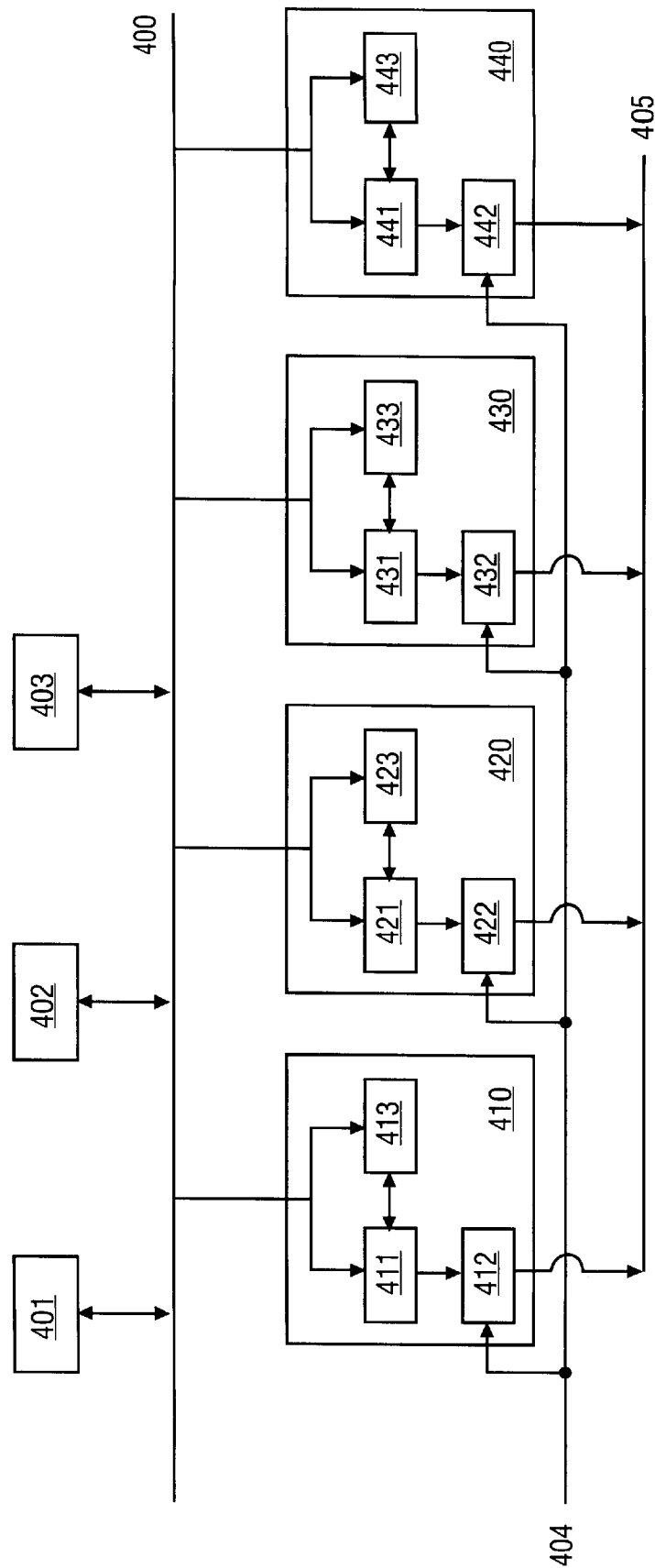
FIG. 4 is a block diagram illustrating an embodiment of the apparatus of the present invention in an electronic system.

FIG. 4 is a block diagram of a portion of a computer system illustrating four embodiments of the apparatus of the present invention. In FIG. 4, bus 400 is a PCI bus. Bus master 401, bus master 402, bus target 403, and event deadlock detectors (EDDs) 410, 420, 430, and 440 are coupled to bus 400. Bus masters 401 and 402 can be any of a variety of devices, such as memory or input/output controllers, that can initiate a transaction on bus 400. Bus target 403 can be any of a variety of devices, such as a memory or input/output controllers, that can be the target of a transaction on bus 400. Each of EDDs 410, 420, 430, and 440 represent an embodiment of the apparatus of the present invention.

EDD 410 is an Initiator Wait EDD, operating in accordance with FIG. 2, and comprising bus tracker circuit 411, counter circuit 412, and memory circuit 413 as described above. EDD 420 is an Target Wait EDD, operating in accordance with FIG. 2, and comprising bus tracker circuit 421, counter circuit 422, and memory circuit 423 as described above. EDD 430 is a first Retry EDD, operating in accordance with FIG. 3, and comprising bus tracker circuit 431, counter circuit 432, and memory circuit 433 as described above. EDD 440 is a second Retry EDD, operating in accordance with FIG. 3, and comprising bus tracker circuit 441, counter circuit 442, and memory circuit 443 as described above.

Two retry EDDs are coupled to bus 400 to support the two bus masters on bus 400. Therefore, one retry EDD is available to count the number of times that a transaction from one bus master is retried, and the other retry EDD is available to count the number of times that a transaction from the other bus master is retried. Additional EDDs can be used to support additional bus masters, or to support a bus master that can have more that one outstanding retried transaction at a time. The assignment of any retry EDD to a particular transaction or bus master can be implemented in any way desired. In one embodiment, a retry EDD is permanently assigned to a particular bus master using a sideband signal between the retry EDD and the bus master. In another embodiment, the retry EDDs are dynamically allocated using a sideband between two or more retry EDDs.

Also in FIG. 4, configuration signal line 404 is coupled to the configuration input port of each EDD, such that the count value of each EDD can be programmed. Trigger signal line 405 is coupled to the trigger output terminal of each EDD, such that if any EDD asserts its TRIGGER signal, the signal on trigger signal line 405 will be asserted. This result can be achieved using any of a variety of techniques, including any well known technique such as an open drain approach.

Thus, the exemplary embodiments of the present invention illustrated in FIGS. 1 and 4 have been described. However, the present invention is not limited to these embodiments or any of the details described. The specification and drawings must be regarded in an illustrative rather than a restrictive sense. The scope of the present invention is defined by the following claims.

What is claimed is:

1. An apparatus for detecting a bus deadlock comprising:
   a bus tracker circuit configured to monitor bus transactions and detect a condition that indicates the occurrence of at least one cycle from a group consisting of wait cycles and retry cycles; and
   a counter circuit configured to indicate that the bus tracker circuit has detected the condition a predetermined number of times.

2. The apparatus of claim 1, wherein the counter circuit is programmable to receive the predetermined number.

3. The apparatus of claim 1, wherein the bus tracker circuit comprises a PCI bus tracker circuit.

4. The apparatus of claim 1, wherein the condition indicates the occurrence of an initiator wait cycle.

5. The apparatus of claim 1, wherein the condition indicates the occurrence of a target wait cycle.

6. The apparatus of claim 1, wherein the condition indicates the occurrence of a retry cycle.

7. The apparatus of claim 1, further comprising a memory circuit configured to store an address of a bus agent involved in a bus transaction.

8. The apparatus of claim 7, further comprising a comparator circuit configured to compare an address of a bus agent involved in a bus transaction with an address stored in the memory circuit.

9. An apparatus for detecting a bus deadlock comprising:

means for monitoring bus transactions and detecting a condition that indicates the occurrence of at least one cycle from a group consisting of wait cycles and retry cycles; and means for indicating that a bus tracker circuit has detected the condition a predetermined number of times.

10. The apparatus of claim 9, further comprising means for storing an address of a bus agent involved in a bus transaction.

11. An apparatus for detecting a Peripheral Component Interconnect (PCI) bus deadlock comprising:

an initiator wait deadlock detector comprising a first bus tracker circuit configured to detect a first condition that indicates the occurrence of an initiator wait cycle, a first memory circuit configured to store an address of a target of a bus transaction that includes the initiator wait cycle, and a first counter circuit configured to indicate that the first bus tracker circuit has detected the first condition a first number of times;

a target wait deadlock detector comprising a second bus tracker circuit configured to detect a second condition that indicates the occurrence of a target wait cycle, a second memory circuit configured to store an address of a target of a bus transaction that includes the target wait cycle, and a second counter circuit configured to indicate that the second bus tracker circuit has detected the second condition a second number of times; and a target retry deadlock detector comprising a third bus tracker circuit configured to detect a third condition that indicates the occurrence of a target retry cycle, a third memory circuit configured to store an address of a target of a bus transaction including the target retry cycle, a comparator circuit configured to compare the address of a bus agent involved in a bus transaction that includes the target retry cycle with an address stored in the third memory circuit, and a third counter circuit configured to indicate that the third bus tracker circuit has detected the third condition a third number of times.

12. The apparatus of claim 11, wherein the first, second, and third number of times are programmable.

13. A method for detecting a bus deadlock comprising:

monitoring bus transactions to detect a condition that indicates the occurrence of at least one cycle from a group consisting of wait cycles and retry cycles;

counting the number of times that the condition is detected; and indicating that the condition has been detected a predetermined number of times.

14. The method of claim 13, wherein the counting step further comprises:

incrementing a count value each time the condition is detected within a specific bus transaction; and initializing the count value if a portion of the specific bus transaction successfully completes.

15. The method of claim 13, wherein the monitoring step monitors PCI bus transactions.

16. The method of claim 13, wherein the group consists of initiator wait cycles.

17. The method of claim 13, wherein the group consists of target wait cycles.

18. The method of claim 13, wherein the group consists of target retry cycles.

19. The method of claim 13, further comprising storing an address of a bus agent involved in a first bus transaction to generate a stored address.

20. The method of claim 19, further comprising comparing an address of a bus agent involved in a second bus transaction with the stored address.

21. A method comprising:

storing an address of a bus agent involved in a bus transaction;

monitoring the bus transaction to detect a condition that indicates the occurrence of at least one cycle from a group consisting of wait cycles and retry cycles;

incrementing a count value if the condition is detected;

initializing the count value if a portion of the bus transaction successfully completes; and indicating that a bus deadlock exists when the count value corresponds to a predetermined number.

22. The method of claim 21, further comprising comparing an address of a bus agent involved in a second bus transaction with the stored address.

* * * * *